(12) United States Patent
Weis

(10) Patent No.: US 9,828,063 B2
(45) Date of Patent: Nov. 28, 2017

(54) GEAR SELECTOR ACTUATOR

(71) Applicant: Schaeffler Technologies AG & Co. KG, Herzogenaurach (DE)

(72) Inventor: Sebastian Weis, Breitenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 77 days.

(21) Appl. No.: 15/009,993

(22) Filed: Jan. 29, 2016

(65) Prior Publication Data

US 2016/0221639 A1   Aug. 4, 2016

(30) Foreign Application Priority Data

Jan. 30, 2015  (DE) .................. 10 2015 201 595

(51) Int. Cl.
*F16C 1/26* (2006.01)
*F16H 61/36* (2006.01)
*B62M 25/02* (2006.01)
*F16H 63/30* (2006.01)

(52) U.S. Cl.
CPC .............. *B62M 25/02* (2013.01); *F16C 1/26* (2013.01); *F16H 61/36* (2013.01); *F16H 63/304* (2013.01); *F16H 2063/3063* (2013.01)

(58) Field of Classification Search
CPC ....... B62M 25/02; B62M 25/04; F16H 61/36; F16H 63/304; F16H 2063/3063; F16C 1/26
See application file for complete search history.

(56) References Cited

U.S. PATENT DOCUMENTS

| 5,765,446 A * | 6/1998 | Patterson | ............... B62M 25/02 74/501.5 R |
| 6,329,728 B1 * | 12/2001 | Kitazawa | ............... H02K 41/03 310/14 |
| 6,969,929 B2 * | 11/2005 | Finkbeiner | ............... H02K 3/47 310/12.21 |
| 8,791,607 B2 * | 7/2014 | Boletis | ................... H02K 41/03 310/12.19 |

FOREIGN PATENT DOCUMENTS

JP     2006112520 A  *  4/2006

OTHER PUBLICATIONS

Machine translation of JP 2006112520 A obtained on Jun. 7, 2017.*

* cited by examiner

*Primary Examiner* — Adam D Rogers
(74) *Attorney, Agent, or Firm* — Volpe and Koenig, P.C.

(57) ABSTRACT

A gear selector actuator (1) is provided with an electric linear drive that is accommodated in a housing (2) that is closed on an axial side by a cover (3) that has an opening (4) for an actuation element. The actuation element is held on the cover (3) and the housing (2) has a cap (5) covering an installation opening of the housing and securing the actuation element.

9 Claims, 3 Drawing Sheets

GEAR SELECTOR ACTUATOR

INCORPORATION BY REFERENCE

The following documents are incorporated herein by reference as id dully set forth: German Patent Application No. 102015201595.5, filed Jan. 30, 2015.

BACKGROUND

The invention relates to a gear selector actuator with an electric linear drive that is accommodated in a housing that is closed on an axial side by a cover that has an opening for an actuation element.

Such gear selector actuators are used in bicycles and electric bikes and make the shifting easier and more convenient for the driver. The gear selector actuator developed by the applicant can be used both in bicycles with internal gears and also with derailleur gears. In connection with a sensor bottom bracket, shifting operations can take place automatically, so that a completely automatic shifting actuation can be realized. In addition to the pedaling frequency (cadence), the output power generated by the driver can also be taken into account here. Depending on the riding situation, a controller determines the correct gear ratio and also an optimum shifting point and actuates the shift gears of the bicycle.

The gear selector actuator comprises a housing in which an electric drive motor is accommodated that is coupled to a linear drive. This linear drive constructed as a spindle drive shifts a spindle nut in the axial direction on which an actuation element, such as a Bowden cable, is mounted, which is coupled with the shift gears.

The housing and the cover must be constructed so that it can be easily opened, in order to install the actuation element, in particular, the Bowden cable, so that this is then held securely. In addition, it should also be possible to open it at a later time, e.g., to replace the Bowden cable.

SUMMARY

The invention is based on the objective of providing a gear selector actuator whose housing can be easily opened in order to install the actuation element.

To achieve this objective, it is provided for a gear selector actuator of the type specified above that, according to the invention, the actuation element is held of the cover and the housing has a cap covering an installation opening of the housing and securing the actuation element.

Simple installation of the actuation element and its secure holding are achieved in the gear selector actuator according to the invention by two measures. On one hand, the actuation element is held on the cover, wherein a positive-fit or non-positive fit connection is created. In this way, the actuation element, more precisely, its end section, is connected rigidly to the cover. Thus, for a linear movement of the spindle nut, the actuation element is carried along accordingly, wherein a shifting operation is triggered. In addition, the gear selector actuator according to the invention has a cap that secures the actuation element in the installed state. The actuation element is thus held captively on the cover. On the other hand, the cap is detachable so that the actuation element is accessible when needed and can be, e.g., replaced.

For the gear selector actuator according to the invention it is preferred that the cap has, on its inner side, a projection that is clamped in the installed state in a groove of the cover in which the actuation element is accommodated. The groove provided in the cover is constructed so that the actuation element can be inserted therein. In this way, play is also eliminated, which makes possible precise shifting of the gears. The projection constructed on the inside of the cap preferably has a block shape and extends in the longitudinal direction of the housing, so that it can be inserted into the end section of the actuation element, wherein the cap can be held in the closed position.

An especially preferred variant of the gear selector actuator according to the invention provides that the actuation element is constructed as a Bowden cable whose end has a fitting. The Bowden cable is placed in the groove of the cover so that the fitting attached to the end contacts it in the axial direction. The Bowden cable is thus supported axially by the fitting and enables play-free shifting.

It is also in the scope of the invention that the cap has a securing element that is accommodated in an undercut of the cover and prevents detachment of the cap from the cover. The securing element is constructed so that it enables a certain relative motion between the cap and the cover, but not complete detachment of the cap. In this way it is prevented that the cap becomes detached—possibly unnoticed by the user. If the cap actually does become detached, this is nevertheless held by the securing element.

An especially preferred construction is one in which the securing element of the gear selector actuator according to the invention is constructed as an anchor that has a connecting piece with projections extending on two sides. This anchor can move in the longitudinal direction of the connecting piece relative to the cover. For this purpose, the cover preferably has a passage opening for the connecting piece. In this way, the connecting piece of the securing element can be pulled from the cover practically completely in the longitudinal direction, so that the cap can be moved from its installation position on the housing into an opened position. In this opened position, the installation opening of the housing is accessible, so that the actuation element can be installed or removed. Here it is especially advantageous that the cap is held captively due to the securing element. The securing element can have different shapes; in addition to a construction as an anchor that has a connecting piece with projections extending on two sides, the securing element can also be constructed as a connecting piece with a thicker end section that is accommodated in the undercut of the cover and thus prevents a complete removal of the securing element out of the cover. According to an alternative construction, an end section of the securing element can also be connected rigidly to the cover. In the case when the undercut of the cover of the gear selector actuator according to the invention has a passage opening for the connecting piece, it is preferred that the undercut is covered in the installed state by the housing. The undercut thus can be located in the cover that is inserted in the installed state in the housing, wherein the undercut on the outside of the cover is covered.

It is also in the scope of the invention that the securing element of the gear selector actuator according to the invention extends approximately perpendicular from the longitudinal axis of the cap. The cap thus can be moved radially relative to the longitudinal axis of the housing. Preferably, the securing element, in particular, its connecting piece, is made from a flexible material, for example, from a soft plastic material that enables elastic bending.

One especially preferred construction of the gear selector actuator according to the invention provides that the cap is made from a flexible plastic material. Preferably, both the cap and also the securing element connected to it are made from the elastic or flexible plastic material. The flexible plastic material has the advantage that later detachment of the cap is possible without a tool just through bending of the cap.

One especially reliable function is given when the cap of the gear selector actuator according to the invention has, on its end opposite the cover, a projection that extends in the longitudinal direction and engages behind the housing in the installed state. This projection prevents undesired detachment of the end of the cap located on the end of the cap opposite the cover.

The installation opening of the gear selector actuator according to the invention can be constructed as an elongated hole that is arranged on an axial end of the housing and has a contact surface for the cap.

BRIEF DESCRIPTION OF THE DRAWINGS

Additional advantages and details of the invention are explained below using an embodiment with reference to the drawings. The drawings are schematic illustrations and show.

DETAILED DESCRIPTION OF THE PREFERRED EMBODIMENTS

Figure 1:
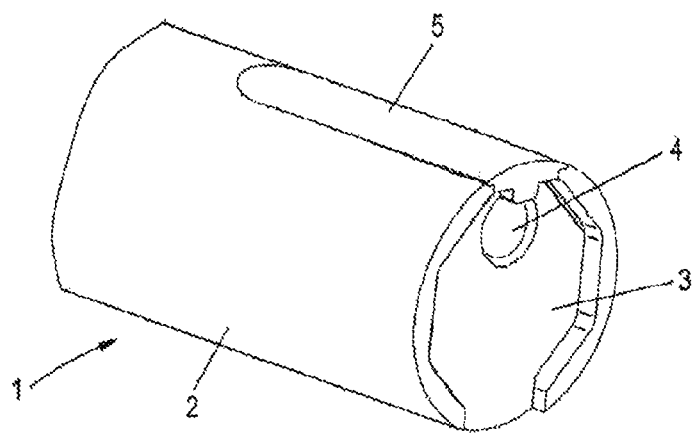
FIG. 1 an end of a gear selector actuator according to the invention in a perspective view, FIG. 2 the mounting of the cover and the cap on the housing, FIG. 3 a view of the cap from below, FIG. 4 a side view of the cap, FIG. 5 a view of the cap in the axial direction, FIG. 6 a perspective view of the cover and the cap, and FIG. 7 a perspective view of an end section of the gear selector actuator according to the invention with opened cap.

FIG. 1 shows an end section of a gear selector actuator 1 that has an essentially cylindrical housing 2. An electrical linear drive (not shown) is accommodated in the housing, comprising a motor that is coupled to a planetary gear that is connected by a clutch to a spindle. The clutch is arranged in the area of a motor mount; the spindle is supported so that it can rotate in a rolling bearing. A spindle nut that can be connected to a Bowden cable moves on the spindle.

In FIG. 1 it can be seen that the end section of the housing 2 is closed by a cover 3 that has an opening 4 for the Bowden cable. The housing 2 comprises a cap 5 that closes an installation opening and simultaneously secures the Bowden cable.

Figure 2:
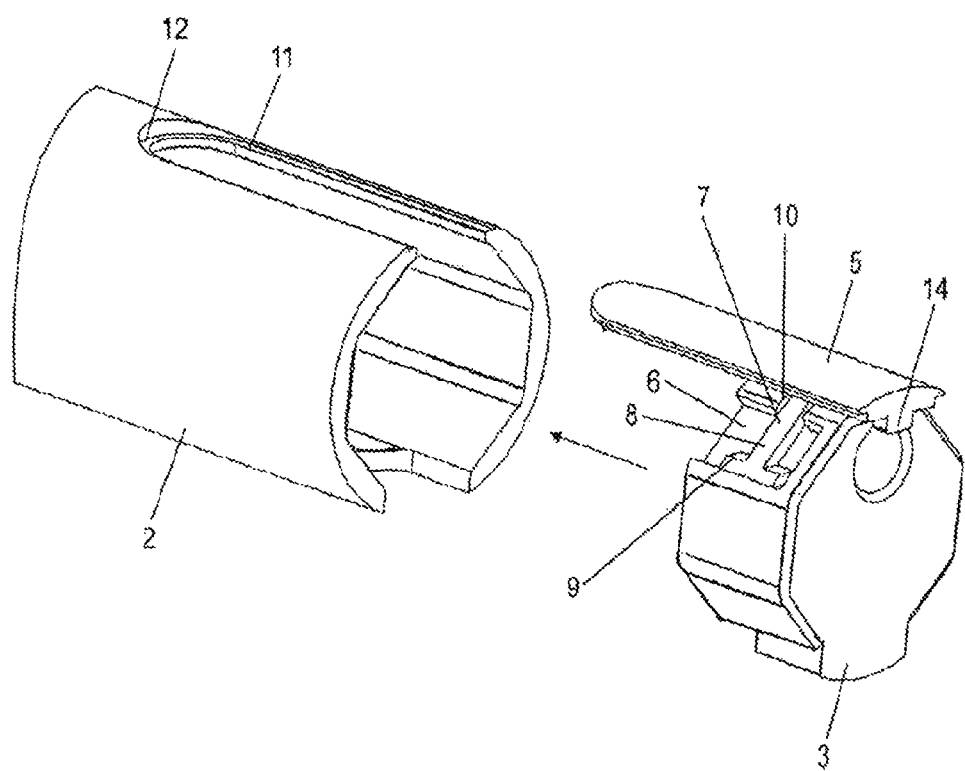
Figure 3:
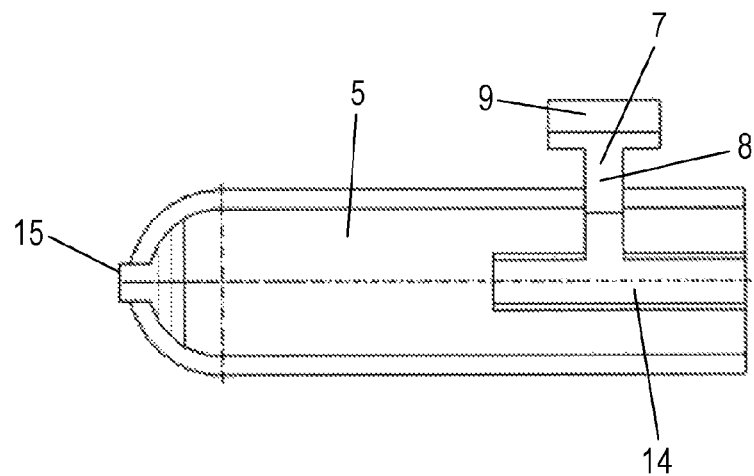
Figure 4:
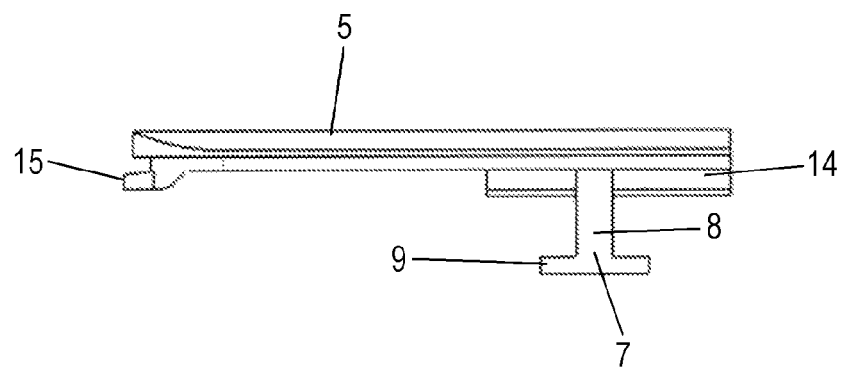
Figure 5:
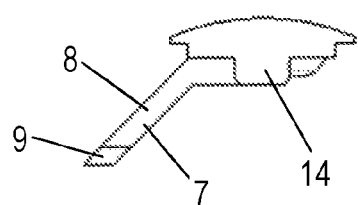

FIG. 2 shows the housing 2 and the cover 3 during installation. The housing 2 has a cylindrical construction on its outside; its inside has an octagonal profile. The cover 3 has a certain extent in the axial direction and has a corresponding mirror-inverted shape, so that it can be inserted into the housing 2 in the position shown in FIG. 2. The cover 3 has a recess 6 that is constructed on its outside and is used for holding an anchor 7 that is connected rigidly to the cap 5. The FIGS. 3, 4, and 5 show the cap 5 in a view from below, in a side view, and in the axial direction. The anchor 7 comprises a connecting piece 8 from whose end projections 9 extend in opposite directions. The anchor 7 thus has a T-shape and is inserted into the recess 6 of the cover 3, as shown in FIG. 2. When the cover 3 is inserted into the housing 2, the recess 6 is covered, wherein detachment of the anchor 7 from the cover 3 is prevented. FIG. 2 shows that a passage opening 10 connects to the recess 6 of the cover 3 and the connecting piece 8 passes through this opening. In the installed state, that is, for the cover 3 pushed into the housing 2, the cap 5 can be detached from the cover 3 in that the anchor 7 connected to the cap 5 passes through the passage opening 10. This motion is stopped, however, as soon as the projections 9 of the anchor 7 contact the inner surfaces of the recess 6. The anchor 7 thus forms a securing element that is accommodated in the recess 6 of the cover 3 forming an undercut and prevents complete detachment of the cap 5 from the cover 3.

In FIG. 2 it can be seen that the installation opening of the housing 2 is constructed as an elongated hole 11 and has a contact surface 12 for the cap 5. Corresponding to the shape of the elongated hole 11, the contact surface 12 has a U-shaped construction. The cap 5 has a mirror-inverted shape corresponding to its outer periphery and has a step so that the cap 5 closes the elongated hole 11 with a positive fit and flush surface connection.

In the scope of the installation of the gear selector actuator 1 on a bicycle, the cap 5 can be raised manually so that the installation opening of the housing 2 formed as an elongated hole 11 is accessible. In this opened state, a Bowden cable can be inserted through the opening 4. By placing the cap 5 on the cover 3, this is clamped.

Figure 6:
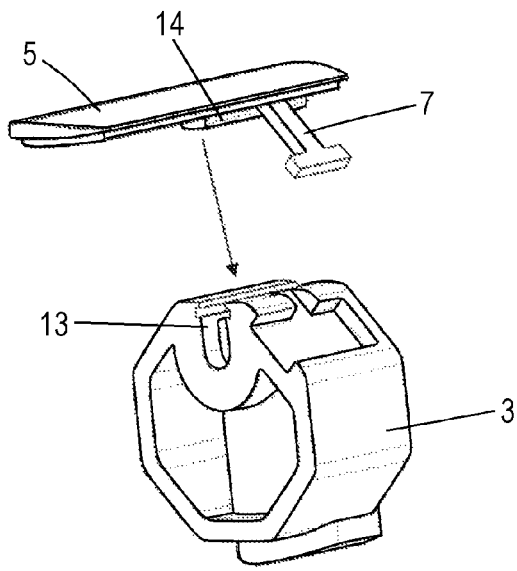

In FIG. 6 it can be seen that the cover 3 has a groove 13 in which a projection 14 of the cap 5 engages. In FIG. 3 it is shown that the cap 5 has, on its end opposite the cover 3, a projection 15 that extends in the longitudinal direction and engages behind the contact surface 12 of the housing 2 in the installed state. The cap 5 and the anchor constructed integrally with it are made from a flexible plastic material so that the cap 5 closes the elongated hole 11 with a positive fit connection. Similarly, the projection 14 on the bottom side of the cap 5 can be pressed or clamped into the groove 13 due to its elasticity, wherein the cap 5 is held securely.

Figure 7:
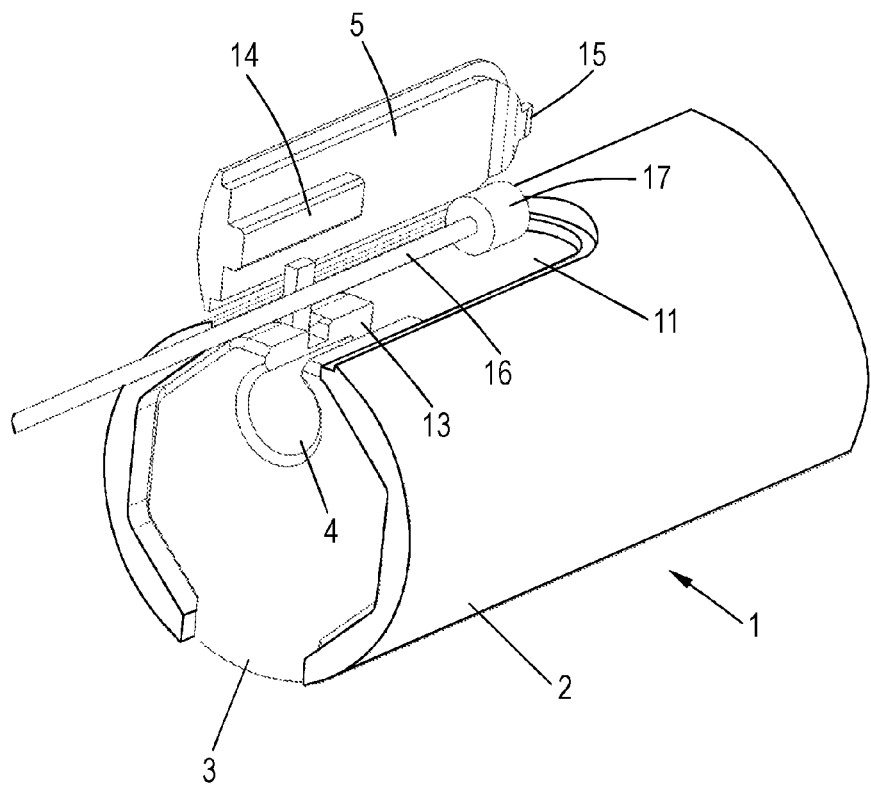

FIG. 7 is a perspective view and shows the housing 2 with installed cover 3 and opened cap 5. In addition, a Bowden cable 16 is shown that has on its end a fitting 17. In practice, the Bowden cable 16 is provided with a sleeve that is not shown, however, in FIG. 7. The Bowden cable 16 is inserted in the shown way into the elongated hole 11 with an open cap 5. For this purpose, the opening 4 of the cover 3 is open at the top. When closing the cap 5, the projection 14 on the bottom side of the cap 5 is clamped into the groove 13 of the cover. The groove 13 is shaped so that the sleeve of the Bowden cable 16 having an end cap on its end can be inserted into the groove 13, whose diameter becomes smaller inwards. In the installed state, the Bowden cable 16 is loaded by a tensile force that is generated by a spring of a shift lever of the bicycle. The Bowden cable is pulled axially against the cover 3 due to the continuous tension.

LIST OF REFERENCE NUMBERS

1 Gear selector actuator
2 Housing
3 Cover
4 Opening
5 Cap
6 Recess
7 Anchor
8 Connecting piece
9 Projection
10 Passage opening
11 Elongated hole
12 Contact surface
13 Groove 14 Projection
15 Projection
16 Bowden cable
17 Fitting

The invention claimed is:

1. A gear selector actuator, comprising a housing that is closed on an axial side by a cover that has an opening for an actuation element that is held on the cover, the housing has an installation opening and a cap covers the installation opening and secures the actuation element, and the cap has a securing element that is accommodated in an undercut of the cover and prevents detachment of the cap from the cover.

2. The gear selector actuator according to claim 1, wherein the cap has, on an inner side thereof, a projection that is clamped in an installed state in a groove of the cover in which the actuation element is accommodated.

3. The gear selector actuator according to claim 1, wherein the actuation element is constructed as a Bowden cable having an end with a fitting.

4. The gear selector actuator according to claim 1, wherein the securing element comprises an anchor that has a connecting piece with projections extending from two sides.

5. The gear selector actuator according to claim 4, wherein the undercut has a passage opening for the connecting piece and is covered in an installed state by the housing.

6. The gear selector actuator according to claim 5, wherein the securing element extends approximately perpendicular from a longitudinal axis of the cap.

7. The gear selector actuator according to claim 1, wherein the cap is formed from a flexible plastic material.

8. The gear selector actuator according to claim 1, wherein the cap has, on an end thereof opposite the cover, a projection that extends in a longitudinal direction and engages the housing in an installed state.

9. The gear selector actuator according to claim 1, wherein the installation opening is constructed as an elongated hole that is arranged on an axial end of the housing and has a contact surface for the cap.

* * * * *